Nov. 5, 1935.  C. W. SINCLAIR  2,019,584
VEHICLE WHEEL CONSTRUCTION
Filed March 7, 1932  4 Sheets-Sheet 1
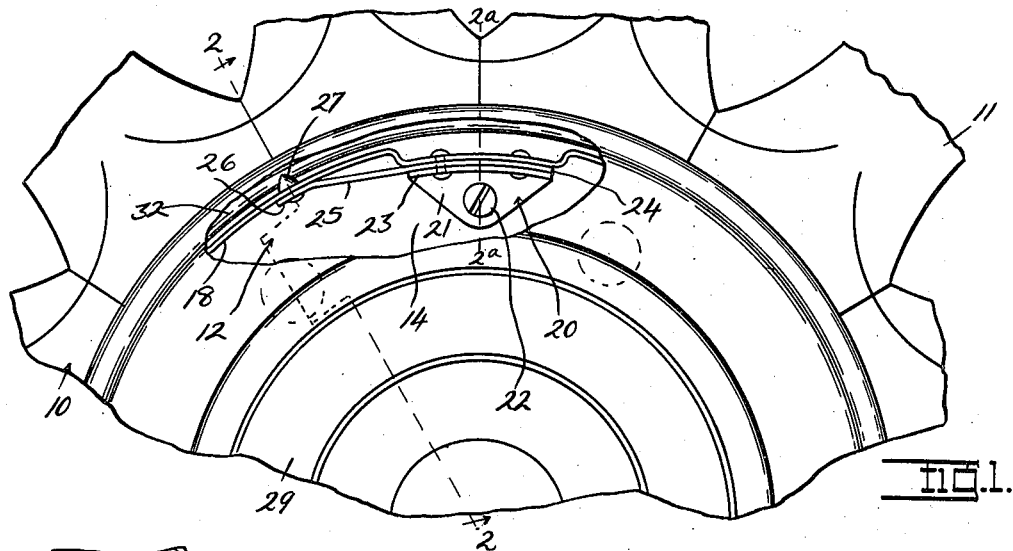
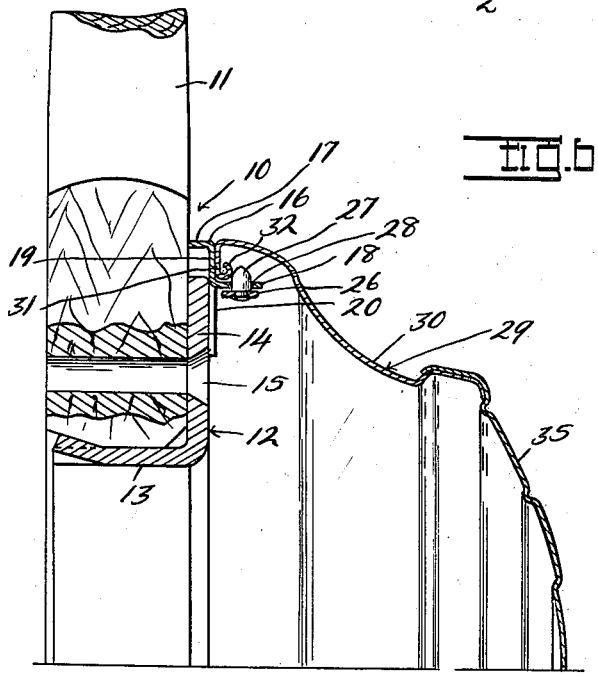
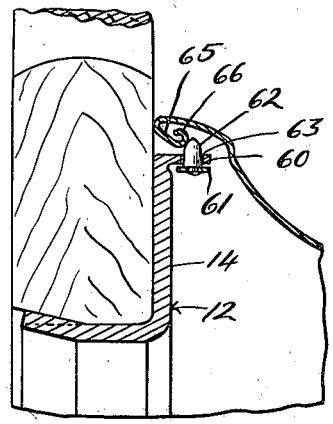
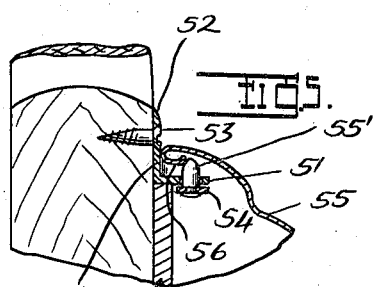
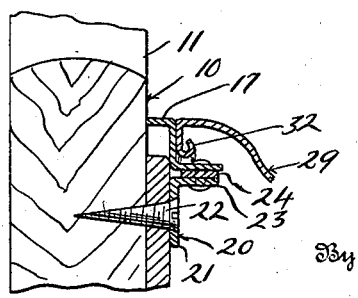
Inventor
Charles W. Sinclair

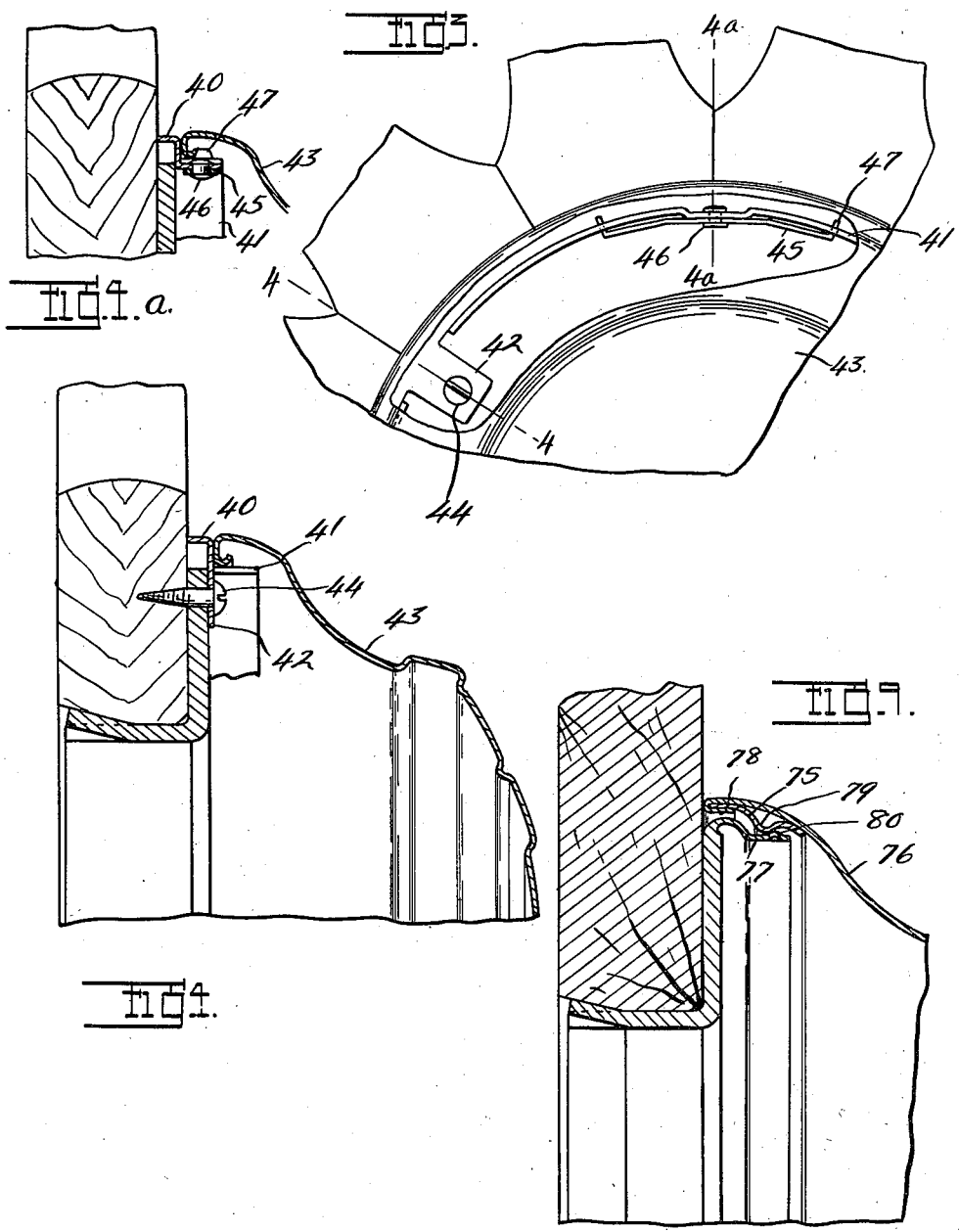

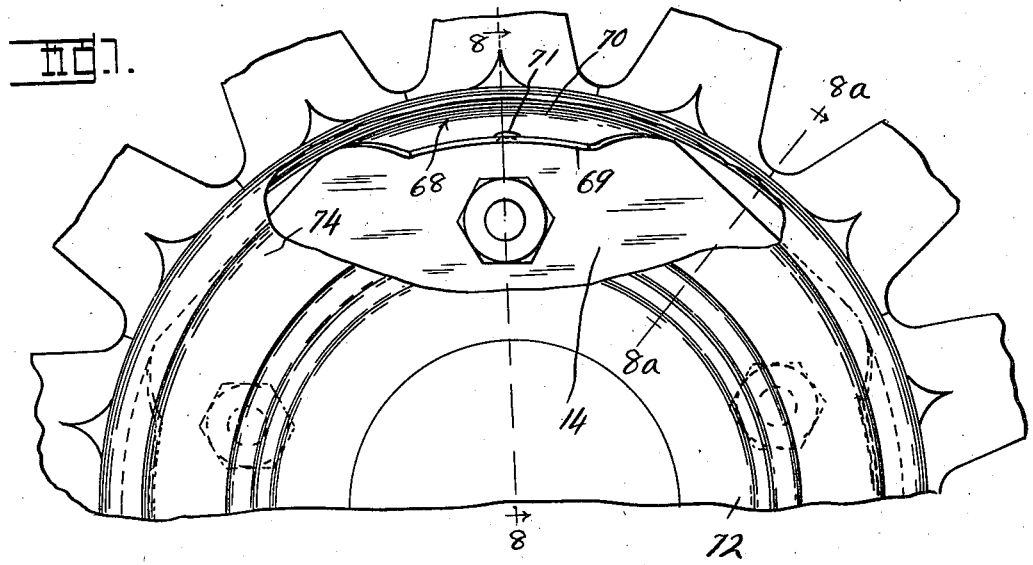
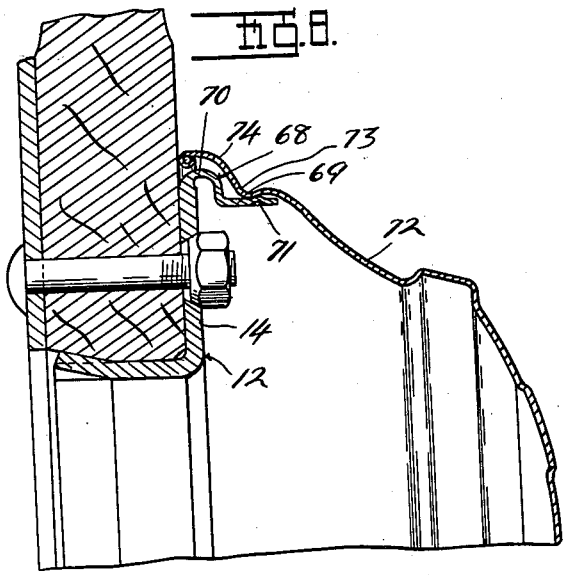
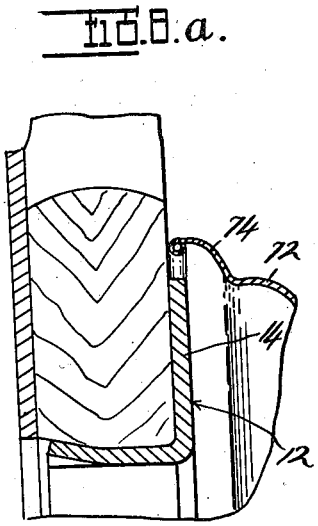

Nov. 5, 1935.          C. W. SINCLAIR          2,019,584
VEHICLE WHEEL CONSTRUCTION
Filed March 7, 1932          4 Sheets-Sheet 4
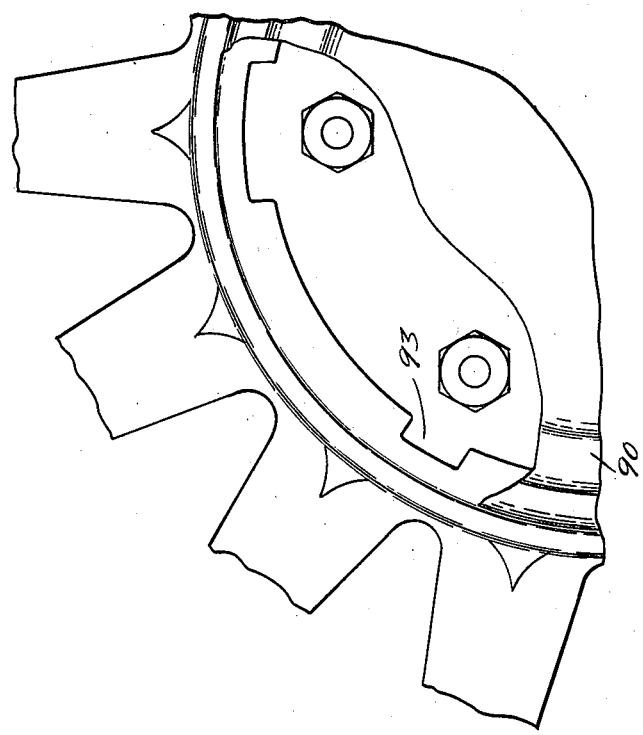
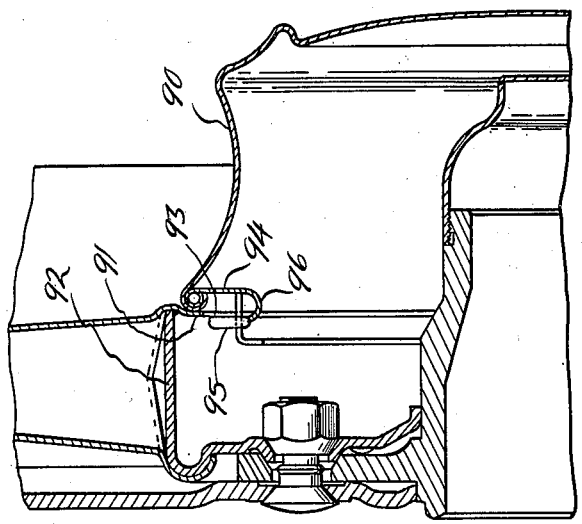
Inventor
Charles W. Sinclair Patented Nov. 5, 1935

2,019,584

UNITED STATES PATENT OFFICE 2,019,584

VEHICLE WHEEL CONSTRUCTION

Charles W. Sinclair, Detroit, Mich., assignor, by mesne assignments, to The Kelsey-Hayes Wheel Company, Detroit, Mich., a corporation of Delaware Application March 7, 1932, Serial No. 597,334

2 Claims. (Cl. 301—108)

REISSUED

This invention relates generally to vehicle wheel constructions and has particular reference to improved means for mounting hub caps upon vehicle wheels.

Although the present invention may be employed with facility in connection with various types of vehicle wheels, nevertheless, it finds particular utility when employed in association with vehicle wheels having wood or pressed steel spoked wheel bodies wherein the construction of the latter renders it difficult to provide for detachably securing hub caps thereto.

The present invention contemplates simplifying the problem of mounting hub caps upon vehicle wheel bodies of the foregoing character by providing the latter with relatively simple inexpensive means fashioned to readily detachably secure hub caps to the wheel bodies.

A further advantageous feature of the present invention resides in the provision of mounting means of the type specified fashioned to not only provide for readily detachably securing the caps to the wheel bodies, but at the same time to insure a rigid connection therebetween so as to prevent accidental disengagement of the caps from the wheel bodies during use.

In addition to the foregoing, the present invention contemplates the provision of mounting means rendering it commercially practical to provide relatively large diametered hub caps in association with spoked wheel bodies of the character hereinbefore set forth.

The foregoing as well as other objects will be made more apparent as this description proceeds, especially when considered in connection with the accompanying drawings, wherein:

Figure 1 is a fragmentary side elevational view of a vehicle wheel body having a hub cap secured thereto in accordance with this invention;

Figure 2 is a cross sectional view taken substantially on the line 2—2 of Figure 1;

Figure 2a is a sectional view taken on the line 2a—2a of Figure 1;

Figure 3 is a fragmentary side elevational view of a spoked wheel body showing still another modification of the present invention;

Figure 4 is a cross sectional view taken on the line 4—4 of Figure 3;

Figure 4a is a sectional view taken on the line 4a—4a of Figure 3;

Figures 5 and 6 are views similar to Figure 2, each showing different alternative forms of the present invention;

Figure 7 is a fragmentary front elevational view of a spoked vehicle wheel body with the hub cap removed for the sake of clearness and featuring another embodiment of the invention;

Figure 8 is a sectional view taken substantially on the line 8—8 of Figure 7;

Figure 8a is a sectional view taken on the line 8a—8a of Figure 7;

Figure 9 is a view similar to Figure 8 showing a further modification of the present invention;

Figure 10 is a fragmentary front elevational view of a pressed metal spoked wheel with the hub cap removed for the sake of clearness and showing still another embodiment of the present invention;

Figure 11 is a cross sectional view taken on the line 11—11 of Figure 10.

For the purpose of illustration, the several embodiments of the invention are shown herein as employed in connection with vehicle wheels of the type having wood and pressed steel spoked wheel bodies. In detail, the various modifications of the invention featured in Figures 1 to 9, inclusive, are shown in connection with vehicle wheels having wheel bodies 10 comprising a plurality of radially extending wooden spokes 11 secured together at the inner ends thereof by means of a spoke retaining ring 12. The retaining ring 12 is provided with a tubular portion 13 forming a seat for the inner ends of the spokes and fashioned to encircle the usual inner hub (not shown) of the wheel. The front end of the tubular portion 13 of the retainer 12 is provided with a radially outwardly extending annular flange 14 embracing the front sides of the spokes and having openings 15 therethrough in alignment with suitable openings through the inner ends of the spokes for receiving suitable fastener elements. The fastener elements are not shown herein, but may be of any desirable type capable of readily detachably securing the wheel body to the inner rub.

As previously indicated, the present invention concerns itself more particularly with the provision of means for mounting a hub cap upon the front side of the wheel body. The foregoing is accomplished in the embodiment of the invention illustrated in Figures 1, 2 and 2a by providing a mounting ring 16 having a rearwardly extending flange 17 at the periphery thereof engageable with the front side of the spoked wheel body 10 radially beyond the outer edge of the annular flange 14 on the retaining ring 12 and having the inner portions thereof bent forwardly opposite the periphery of the annular flange 14 to provide an axially forwardly extending flange 18. The rearwardly extending annular flange 17 on the ring is of sufficient length to position the inner surface of the intermediate connecting portion 19 of the ring flush with the front side of the radially extending flange 14 on the spoke retainer 12.

The ring 16 is secured in the aforesaid position by means of a plurality of brackets 20 located within the flange 18 and spaced circumferentially from each other. The brackets 20 are provided with depending flanges 21 embracing the front side of the annular flange 14 on the retaining ring 12 and clamped thereto by means of screws 22 extending through openings in the annular flange 14 and anchored within the spokes 11. The outer portions of the brackets 20 are bent forwardly to provide attaching flanges 23 riveted or otherwise suitably secured to depressed portions 24 of the flange 18.

In order to permit readily securing a hub cap to the mounting ring 16, I provide a plurality of spring fingers 25 located within the flange 18 at circumferentially spaced points. As shown particularly in Figure 1 of the drawings, the free end portions 26 of the flexible fingers 25 engage the inner surfaces of the flange 18 at points spaced circumferentially from the brackets 20 and the opposite ends of the fingers are interposed between the flanges 23 on the brackets and the adjacent surfaces of the depressed portions 25. The arrangement is such as to provide for securing the fingers and mounting ring 16 to the brackets 20 by common securing means. The spring fingers are secured under tension within the flange 18 so as to normally compress the free ends thereof into engagement with the inner surfaces of the latter flange at the circumferentially spaced points aforesaid. As shown particularly in Figure 1, the free ends of the fingers 25 are provided with projections 27 extending radially outwardly therefrom through suitable openings 28 formed in the flange 18. The projections 27 are fashioned for snap engagement with a suitable hub cap 29 for securing the latter to the front side of the wheel body.

While the specific form of hub cap 29 may vary in accordance with design, nevertheless, I have shown the same herein for the purpose of illustration as comprising a barrel portion 30 having a radially inwardly extending annular flange 31 at the rear end thereof of sufficient diameter to extend over the annular flange 18 on the mounting ring for engagement with the front side of the connecting portion 19 of the latter. The inner edge of the flange 31 terminates in a forwardly extending bead 32 fashioned to snap into engagement with the projections 27 on the free ends of the flexible fingers 25. The arrangement is such that upon assembling the hub cap with the wheel body, the annular bead 32 is piloted into engagement with the spring pressed projections 27 by the forward ends of the flanges 18 whereupon continued axial movement of the cap rearwardly relative to the wheel body causes radial inward movement of the projections 27 until the bead 32 assumes a position rearwardly of the projections at which time the latter are returned to their outermost positions in advance of the bead 32 by the action of the spring fingers 25. In this connection, it is to be noted that the dimension of the bead is so determined with respect to the space between the projections 27 and the connecting wall 19 of the mounting ring as to provide for securing the flange 31 of the hub cap under compression against the mounting ring. The radial dimension of the flange 31 on the rear end of the hub cap is so determined with respect to the corresponding dimension of the connecting portion 19 on the mounting ring as to position the rear end portion of the cap substantially flush with the rearwardly extending flange 17 on the ring. In other words, the foregoing construction is such that when the cap is in assembled relation with the mounting ring, the same forms in effect a continuation of the rearwardly extending flange 17 on the latter and inasmuch as this flange engages the front side of the wheel body radially beyond the periphery of the mounting ring, it will be apparent that the hub cap cooperates with the mounting ring to completely conceal the spoke retaining ring. The opening through the front end of the barrel portion 30 is closed by a suitable cap 35 having the peripheral portions 36 thereof overlapping the front end of the barrel and suitably secured thereto.

The modified form of the invention illustrated in Figures 3, 4 and 4a is similar in construction to the embodiment of the invention shown in Figures 1 and 2 in that a mounting ring 40 is provided for readily detachably securing a hub cap 43 to the wheel body. The ring 40, however, differs specifically from the mounting ring 16 hereinbefore described in that portions of the axially forwardly extending flange 41 on the ring are severed and bent inwardly to provide a plurality of circumferentially spaced tongues 42. The tongues 42 are clamped to the front side of the spoke retaining ring 12 by means of suitable screws 44 having shank portions threaded within the wooden spoked wheel body. The above construction is such as to permit eliminating the brackets 20 featured in the above described form of the invention.

The annular forwardly extending flange 41 on the retaining ring 40 is also provided with a plurality of circumferentially spaced spring fingers 45 fashioned to snap into engagement with the hub cap 43 upon assembling the latter with the wheel body. The spring fingers 45 in the present instance differ from the spring fingers 25 hereinbefore described in that the same are rigidly secured intermediate the ends to the inner surface of the annular flange 41 as at 46 and are provided with projections 47 at the free ends thereof fashioned to extend radially outwardly through suitable openings formed in the annular flange 41. By reason of the above construction, it will be apparent that each of the fingers engage the hub cap at circumferentially spaced points, thereby insuring an efficient connection between the hub cap and wheel body. With the exception of the above differentiations, the present form of the invention is identical to the first-described modification in that the spring fingers 45 normally maintain the hub cap 43 in engagement with the mounting ring 40 under compression and in that the latter ring cooperates with the hub cap 43 to completely conceal the spoke retaining ring 12.

In the modification illustrated in Figure 5, the hub cap retaining ring 50 is substantially L-shaped in cross section having one of the flanges 51 thereof seated upon the periphery of the spoke retaining ring 12 and having the other flange 52 projecting radially outwardly from the flange 51 in engagement with the front side of the wheel body. The flange 52 is permanently secured to the wooden spoked wheel body by means of suitable screws 53, while the flange 51 projects axially forwardly beyond the front side of the spoke retaining flange. The flange 51 is provided with a plurality of spring fingers 54 fashioned to snap into engagement with a suitable hub cap 55 for detachably securing the latter to the wheel body. While the fingers 54 may be any one of a number of suitable designs, I have shown the same herein for the purpose of simplicity as being identical in construction to the fingers 25 featured in the first-described form of the invention. Briefly described, the fingers 54 are suitably secured to the inner surfaces of the flange 51 and are provided with projections 55' at the free ends thereof fashioned to extend radially outwardly through suitable openings formed in the flange 51 for snap engagement with the hub cap 55.

The hub cap 55 differs from either of the hub caps above referred to in that the rear end thereof is provided with a return-bent portion 56 terminating in a bead for engaging the projections 55' on the spring fingers 54. The length of the return-bent portion 56 is so determined as to provide for compressing the rear edge of the hub cap into engagement with the front side of the flange 52 when the parts are in the position shown in Figure 5.

In the specific embodiment of the invention illustrated in Figure 6, the mounting ring for the hub cap is shown as formed integral with the spoke retaining ring 12. In detail, the front flange 14 of the spoke retaining ring 12 terminates at the periphery thereof in a forwardly and axially extending annular flange 60. Located within the flange 60 and secured thereto at circumferentially spaced points is a plurality of spring fingers 61 having projections 62 at the free ends thereof extending radially outwardly through suitable openings 63 formed in the flange 60. For the purpose of illustration, the fingers 61 may be considered identical in construction to the fingers 25 in that the projecting portions 62 thereof are fashioned to snap into engagement with the rear end of a hub cap designated in Figure 6 by the reference character 64. The rear end of the hub cap 64 is of such diameter as to permit extending the same over the annular flange 60, and as will be observed from Figure 6, is provided with a forwardly and inwardly inclined flange 65 terminating in a bead 66 for engaging the projecting portions 62 of the spring fingers 61. The construction is such that when the cap is in assembled relation with the wheel body, the rear edge of the same is compressed against the wheel body by the spring fingers radially beyond the annular flange 60 on the spoke retaining ring 12 so as to completely conceal the latter.

The modification of the invention illustrated in Figures 7, 8 and 8a differs from either of the foregoing described forms of the invention in that the front flange 14 of the spoke retaining ring 12 is provided with circumferentially spaced extensions 68 adapted to be bent forwardly to provide axially extending hub cap attaching portions 69. In manufacture, the spoke retaining ring 12 is preferably developed from a square blank having the corners thereof bent inwardly to form curved portions 70 and having the free ends of the latter bent laterally forwardly to provide axially extending attaching portions 69. If desired, the aforesaid corners of the blank may be ironed so as to increase the density of the metal forming the attaching portions 69.

By forming the attaching portions 69 in the manner specified above, the same possess sufficient resiliency to provide for obtaining the desired snap engagement with the hub cap 72 without the assistance of separate spring fingers of the type previously set forth. In the present instance, the hub cap 72 is provided with an annular inwardly extending shoulder 73 intermediate the ends thereof fashioned to snap over suitable bosses 71 projecting outwardly from the forward ends of the attaching portions and is further provided at the rear end thereof with an outwardly and rearwardly curved portion 74 engageable with the front side of the wooden spoked wheel body radially beyond the spoke retaining ring 12 so as to completely conceal the latter.

The embodiment of the invention illustrated in Figure 9 is substantially the same in construction as the modification of the invention shown in Figures 7 and 8 with the exception that an annular ring 75 is secured to the rear end of the hub cap 76 for snap engagement with the attaching portions 77 extending forwardly from the spoke retaining ring 12. In detail, the rear edge of the hub cap 76 is return-bent over the adjacent edge of the ring 75 as at 78 for securing the ring to the inner surface of the hub cap. The intermediate portions of the ring 75 are bent inwardly to provide an annular bead 79 fashioned to snap into engagement with the bosses 80 formed on the attaching portions 77. The ring 75, in addition to reinforcing the cap and providing for securing the same to the attaching portions, is so designed as to normally compress the rear edge of the hub cap against the front side of the wheel body radially beyond the spoke retaining ring so as to completely conceal the latter.

While the various embodiments of the invention previously described are structurally different from each other, nevertheless, there are several important features common to each of the modifications. For example, each of the above described forms of the invention contemplates the provision of means at the front side of the wheel body fashioned for snap engagement with a suitable hub cap. In each instance, the aforesaid means, in addition to forming a pilot for guiding the cap in assembled relation with the wheel body, also provides for securing the cap under compression in a position wherein the spoke retaining ring at the front side of the wheel body is completely concealed from view. It will be observed from the previous descriptions of the several modifications that in each instance the hub cap mountings constitute relatively simple and inexpensive means for attaching large diameter hub caps to spoked wheel bodies. In featuring simplicity, attention may again be directed to the specific embodiments of the invention illustrated in Figures 7 to 9, inclusive, wherein the hub cap attaching portions are fashioned by bending portions of the spoke retaining ring axially forwardly and wherein these portions are sufficiently resilient to provide for the desired snap engagement of the hub caps therewith. Constructions of this latter character offer the possibility of eliminating the provision of separate mounting rings and spring fingers of the type shown for example in the first-described form of the invention.

In the modification illustrated in Figures 10 and 11, I have shown the manner in which a hub cap 90 may be readily detachably secured to a demountable wheel having a pressed metal spoked wheel body. In detail, the front side of the spoked wheel body is provided with a centrally arranged annular portion 91 extending inwardly beyond the hub member 92 and having a plurality of circumferentially spaced slots 93 therein for receiving portions of the hub cap 90 upon assembling the latter with the wheel body. The hub cap 90 may be of any suitable shape and is provided at the rear end thereof with an inwardly extending mounting ring 94. In the present instance, the mounting ring 94 is formed separately from the hub cap and is provided with a bead at the periphery thereof secured to the rear end of the hub cap by crimping the latter end thereof over the bead. The inner portions of the mounting ring are fashioned to provide an axially extending pilot 95 projecting rearwardly beyond the rear end of the hub cap for engaging the inner edges of the annular attaching portion 91 on the wheel body to guide the hub cap into engagement with the latter.

In order to provide for readily detachably securing the hub cap to the wheel body, suitable U-shaped spring fingers 96 are carried by the cap at circumferentially spaced points for engagement with the attaching portion 91 on the wheel body. The pilot 95 is severed at circumferentially spaced points and the severed portions thereof are fashioned to form the spring fingers 96. In the present instance, the spring fingers are substantially U-shaped in cross-section having the free ends thereof projecting radially outwardly beyond the pilot and fashioned to freely extend through the slots 93 formed in the attaching portion 91 of the wheel body. The foregoing arrangement is such that when it is desired to assemble the hub cap upon the wheel body, the pilot 95, which, incidentally, extends rearwardly beyond the free ends of the fingers, is engaged with the inner edges of the annular attaching portion 91 and the aforesaid ends of the fingers aligned with the slots 93 aforesaid. When the free ends of the fingers have been properly aligned with the slots, the cap is moved axially rearwardly relative to the wheel body until the rear end of the same engages the front side of the wheel body whereupon the fingers assume a position within the slots so that rotation of the cap relative to the wheel body causes the fingers to yieldably engage the rear side of the attaching portions 91 on the wheel body and thereby establish an interlocking connection between the latter and hub cap. If desired, the free ends of the fingers may be transversely bowed as shown in Figure 11 so as to in effect cam the same into engagement with the rear side of the attaching portion 91 on the wheel body upon rotation of the cap relative thereto. It will further be apparent from Figure 11 that the spring fingers are so designed as to secure the rear end of the hub cap under compression against the front side of the wheel body, with the result that the hub cap is rigidly secured in place.

While in describing the various embodiments of the invention particular stress has been placed upon association thereof with wood and pressed steel spoked wheel bodies, nevertheless, it is to be understood that the same are equally applicable for use in connection with various other types of wheel bodies, and, accordingly, reservation is made to make such changes as may come within the purview of the accompanying claims.

What I claim as my invention is:

1. A vehicle wheel having in combination, a wheel body member, a retainer for the wheel body member having a polygonally shaped portion at the front side of the wheel body member with the corners of said portion extending axially forwardly from the member and of less thickness than the body portion of the retainer to impart a limited amount of flexibility to said corners, and a hub cap for the wheel body member having a snap engagement with said corners.

2. A vehicle wheel having in combination, a wheel body member, a retainer for the wheel body member having a polygonally shaped portion at the front side of said member with the corners of said portion extending axially forwardly and being of less thickness than the body portion of the retainer to impart a limited amount of flexibility to the corners, and a hub cap having a portion fashioned to snap into engagement with the flexible corner portions and having another portion engageable with the front side of the wheel body radially outwardly beyond the retainer for concealing the latter.

CHARLES W. SINCLAIR.